United States Patent
Pitzel et al.

(10) Patent No.: US 7,263,688 B2
(45) Date of Patent: Aug. 28, 2007

(54) METHOD AND APPARATUS FOR DYNAMIC DATA-TYPE MANAGEMENT

(75) Inventors: Bradley John Pitzel, Seattle, WA (US); William A. Roberts, Seattle, WA (US); Timothy Michael Graham, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 828 days.

(21) Appl. No.: 10/253,397

(22) Filed: Sep. 23, 2002

(65) Prior Publication Data

US 2004/0059776 A1    Mar. 25, 2004

(51) Int. Cl.
G06F 9/44 (2006.01)
(52) U.S. Cl. ...................................... 717/121
(58) Field of Classification Search ............... 717/120, 717/168–178
See application file for complete search history.

(56) References Cited

U.S. PATENT DOCUMENTS

| | | | | |
|---|---|---|---|---|
| 5,423,034 A | * | 6/1995 | Cohen-Levy et al. | 707/10 |
| 5,845,293 A | * | 12/1998 | Veghte et al. | 707/202 |
| 5,864,870 A | * | 1/1999 | Guck | 707/104.1 |
| 6,546,417 B1 | * | 4/2003 | Baker | 709/206 |
| 6,549,916 B1 | * | 4/2003 | Sedlar | 707/200 |
| 6,952,714 B2 | * | 10/2005 | Peart | 709/203 |
| 7,016,920 B2 | * | 3/2006 | Mastrianni et al. | 707/200 |
| 2002/0178239 A1 | * | 11/2002 | Kinyon et al. | 709/220 |

OTHER PUBLICATIONS

K. Ivens, "Optimizing the Windows Registry", IDG Books, Feb. 1998.*

* cited by examiner

*Primary Examiner*—Meng-Al T. An
*Assistant Examiner*—Trenton J. Roche
(74) *Attorney, Agent, or Firm*—Axios Law Group; Adam L. K. Philipp (57) ABSTRACT

A method and apparatus for dynamically managing data-type associations and relationships includes providing a first global data-type association ruleset including one or more predefined operational relationships between two or more applications, determining whether an updated global data-type association ruleset is available, and dynamically obtaining the updated global data-type association ruleset to facilitate modification of one or more predefined operational relationships between two or more applications locally installed on the client device.

22 Claims, 7 Drawing Sheets

METHOD AND APPARATUS FOR DYNAMIC DATA-TYPE MANAGEMENT

BACKGROUND OF THE INVENTION

1. Field of the Invention

The present invention relates generally to the field of computing. More specifically, the present invention relates to a method and apparatus for dynamically managing data-type file associations and relationships.

2. Background Information

With advances in integrated circuit, microprocessor, networking and communication technologies, an increasing number of devices, in particular, digital computing devices, are being networked together to facilitate the exchange of information. Accordingly, traditional audio and video content providers such as radio and television studios, recording associations, independent recording artists, and so forth, are turning to digital communication networks such as the Internet for dissemination and distribution of multimedia content.

Multi-purpose Internet Mail Extensions (MIME) represent an extension of the Simple Mail Transport Protocol (SMTP) that enables the exchange of different types of data files including such types as audio, video, images, application programs, and so forth on the Internet. Network servers typically insert a MIME header at the beginning of each web transmission, while client devices typically use the inserted MIME information to select an appropriate "player" application to render the content. Some such players may be built into a given web client or browser while other players or plug-ins may need to be downloaded.

Typically, each application to be installed on a client device contains its own list of data-type (e.g. file-type, MIME-type) associations that the application blindly associates with itself upon installation and manages thereafter. Accordingly, it is not uncommon for an application being installed onto a client device to associate itself with some or all file/MIME types previously assigned to other applications. Unfortunately for the user however, this re-association behavior can detract from the usability of a system forcing the user the manually restore their previous file/MIME type associations. Additionally, as new protocols and/or data-types are developed, users are often forced to download new plug-ins/updates or software applications to handle the new protocols/data-types, further detracting from the user experience.

As the number of player/rendering applications available on the market continues to increase, the problems associated with data-type management compound.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

The present invention describes a method and apparatus for dynamically managing data-type associations and relationships. When used in the context of managing data-type associations and relationships, the term "dynamically" is generally meant to imply that data-type associations and relationships can be managed based or dependent upon conditions or parameters that change.

In the description to follow, various aspects of the present invention will be described, and specific configurations will be set forth. However, the present invention may be practiced with only some or all aspects, and/or without some of these specific details. In other instances, well-known features are omitted or simplified in order not to obscure the present invention.

The description will be presented in terms of operations performed by a processor based device, using terms such as receiving, determining, generating, performing and the like, consistent with the manner commonly employed by those skilled in the art to convey the substance of their work to others skilled in the art. As is well understood by those skilled in the art, the quantities take the form of electrical, magnetic, or optical signals capable of being stored, transferred, combined, and otherwise manipulated through mechanical, electrical and/or optical components of the processor based device.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The description repeatedly uses the phrase "in one embodiment", which ordinarily does not refer to the same embodiment, although it may. The terms "comprising", "including", "having", and the like, as used in the present application, are synonymous.

Overview

Figure 1:
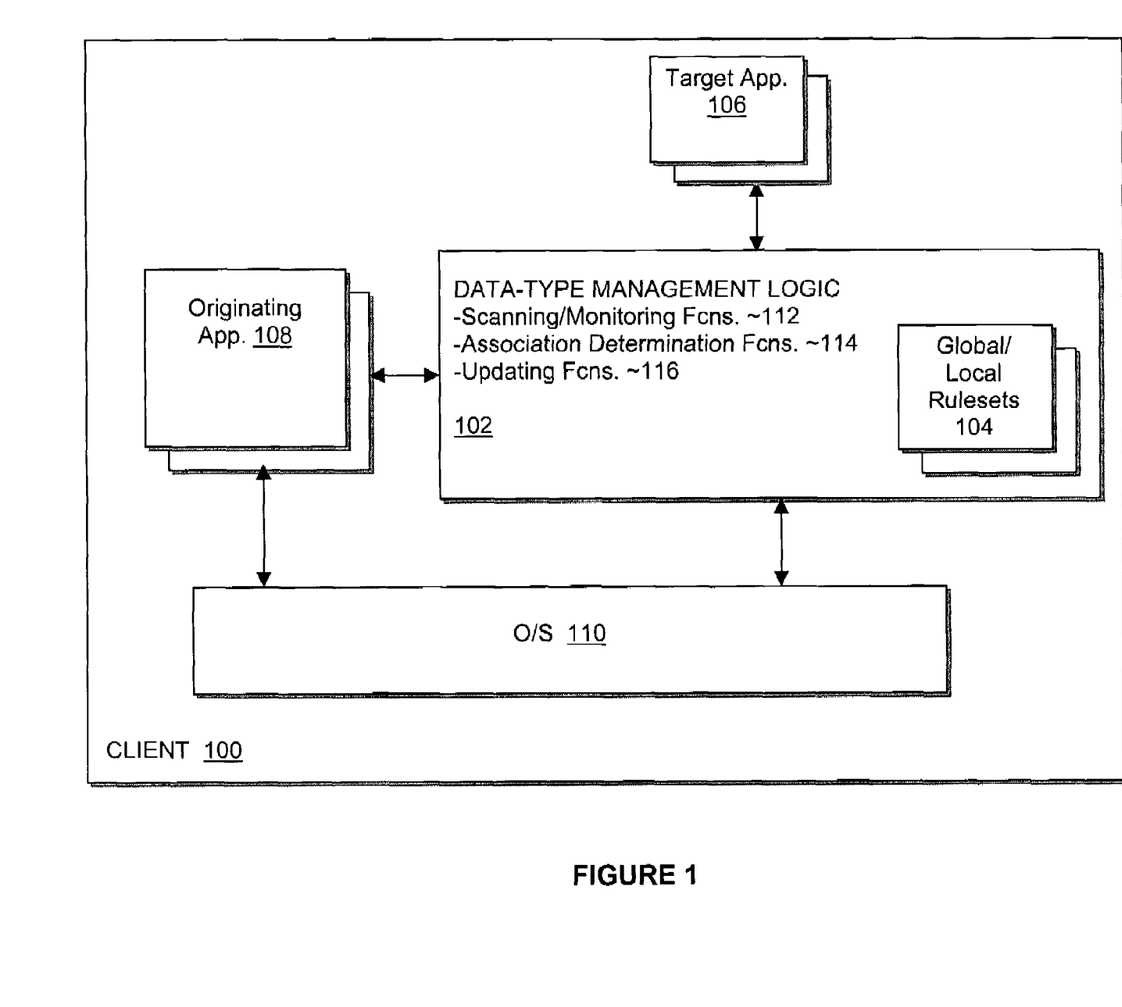
FIG. 1 illustrates an overview of the present invention in accordance with one embodiment of the invention.

FIG. 1 illustrates an overview of one embodiment of the data-type management facilities of the present invention. As illustrated, client 100 is equipped with data-type management logic (hereinafter DTM logic) 102 including global/local rulesets 104, target applications 106, originating applications 108, and operating system 110. Client 100 may represent a broad range of digital systems known in the art, including but not limited to devices such as wireless mobile phones, palm sized personal digital assistants, notebook computers, desktop computers, set-top boxes, game consoles, and so forth. Each of global/local rulesets 104 represents one or more data relationships used to affect how a given system such as client 100 may react when presented with a particular situation. A global ruleset identifies one or more data relationships that are or may be applicable across a wide variety of client systems, whereas a local ruleset generally identifies one or more data relationships that are applicable to a single local client system. Similarly, a global data-type association generally refers to data-type associations that are or can be applicable across a wide variety of client systems, whereas local data-type associations generally refer to data-type associations that are specific to a single client system.

In accordance with one embodiment of the invention, DTM logic 102 facilitates the creation and management of file type and MIME type associations between one or more originating applications 108 and one or more target applications 106. The term "association" as used herein broadly refers to the manner in which two applications are related. In one embodiment, the term association refers to the manner in which one application, such as target application 106, is launched/executed or is caused to be launched/executed by a second application, such as originating application 108, to handle a given transaction. For example, if a "web-surfing" user encounters (via a first web browser application) a web page containing a link to an audio file of type ".RAM" corresponding to a second application not natively know by the browser, the browser will perform a lookup to identify that the second application is the handler for .RAM files. Thereafter, the browser launches the second application to render the audio content whenever a RAM file-type is encountered. In such an example, the browser application associates the second application with RAM files. The term "application" as used herein is intended to broadly refer to a software program or group of software programs designed for use by end users and including, but not limited to database programs, presentation programs, word processors, spreadsheets, web browsers, media players, and so forth.

In one embodiment of the invention, DTM logic 102 is equipped with one or more scanning/monitoring functions 112 to facilitate identification of data-type associations on client 100. In one embodiment, DTM logic 102 performs data-type association scanning to determine whether target applications are properly registered in accordance with e.g. global/local rulesets 104. Such data-type association scans may be performed in the background so as to be imperceptible to a user and/or may be scheduled to be performed on a regular or semi-regular basis, or may be spontaneously triggered by another application.

In one embodiment, DTM logic 102 registers data-type/application associations for a variety of originating applications 108. For example, DTM logic 102 registers data-type/application associations for a variety of web browsers (e.g. originating applications 108) including Netscape helper application, Netscape protocol handler for RTSP protocol Versions 4.X and higher, IE (Win, Mac) (Versions 4.X and higher), Windows file type registry, Windows 2000/Millennium/XP additional file type registry (Win2K Viewer), Mac OS8/9/X Internet registry, AOL Browser, MSN Explorer, Opera Browser .INI file (Opera internal registry) and so forth. In one embodiment, DTM logic 102 may additionally register protocols, globally unique identifiers (such as OCXs), and default hardware such as audio CD's. Each of these items shares the property of allowing an application, such as target application 106, to be launched in response to the occurrence of an event. For example, MIME-type registration allows a first application to launch when a user 'clicks' a link on a web page, whereas CD audio registration enables an application to launch when the user inserts an audio CD into the computer's CD drive.

In one embodiment, DTM logic 102 further includes one or more association determination functions 114 to determine various data-type associations, and/or to claim/reclaim data-types. In one embodiment, reclaiming a data-type includes the action of taking a data-type away from another application on the user's system once it has been claimed by DTM logic 102. In one embodiment, the claiming of data-types is done differently depending upon whether the data-type is a public data-type or private data-type. The term 'public data-type' broadly refers to one or more file/MIME-types that are generally available for common public use and may be associated with one or more applications from a single vendor or one or more applications from multiple vendors. The term 'private data-type' on the other hand broadly refers to one or more proprietary data-types that are intended to be exclusively associated with one or more applications from e.g. the same vendor.

In one embodiment, the association determination functions 114 of DTM logic 102 utilize global/local rulesets 104 to both store and retrieve identified and/or predetermined file-type associations. In one embodiment of the invention, the data-type management facilities of the present invention, and in particular global/local rulesets 104, are organized into three categories of databases. These include a master database to provide a software vendor's view of data-type associations, an additions database to log data-types and applications that are not part of the master database, and a local database to detail the applications and data-type associations unique to a given user's system. The term 'database' is used herein as a generic term merely describing a collection of data and does not imply any specific organizational structure. Moreover, such data collections need not necessarily be associated with a relational database engine, however, they may be.

In one embodiment, each of these categories of databases is broken up into an applications ('App') database, which details the system's view of the applications associations for data-types, protocols, and system events, and a data-type ('DT') database, which details the system's view of which data-types, protocols, and system events to monitor. In one embodiment, there are two distinct sets of information stored locally in the data-type management system of FIG. 1. One set of locally stored information declares data-types and application definitions, and encompasses the Master DB and Additions DB. This data is relatively static and can be updated via an auto update function (described below), a new application installation, or when one or more new 'rogue' applications are discovered (described below). The other set of locally-stored information encompasses the local databases, which describe the current state of data-type registration/ownership on the user's system. In one embodiment, changes made to a user's system as far as new data-types, or plug-ins installed to the user's system (e.g. client 100) are added to the Additions databases.

Finally, updating functions 116 facilitate flexible and/or dynamic updates to global/local rulesets 104 to provide transparent addition, removal and/or modification of data-type associations by client 100. In accordance with one embodiment, data-type management services 102 of the present invention may reserve one or more data-types for future use by client 100. Data-type reservation, in general, is the act of taking over an unassociated data-type when either a suitable application to handle the data-type is not installed on the user's system, or a suitable application is installed, but the data-type has not been claimed by the application.

System Scans

Data-type management logic 102 performs a variety of background scanning as e.g. a common/shared application independent service. In one embodiment, no visible user interface(s) (UI) are displayed to the user during a transparent scanning process. However, silent re-associations (i.e. data-type associations not requiring user confirmation before proceeding) are performed as needed, and any associations requiring user approval are noted, stored and used when the appropriate time arrives for a UI to be displayed. In one embodiment, scanning/monitoring functions 112 operate to perform four distinct types of system scans detailed below.

At the startup of data-type management logic 102, or at the startup of each user account on client 100 in the event O/S 110 allows multiple user accounts, a Force Write Check background system scan (hereinafter 'FWC scan') is performed. In an FWC scan, data-type management logic 102 checks a predetermined value within a set of data-type management preferences associated with a current user. For example, on WINDOWS based systems such a value may be located in the HKEY_CURRENT_USER\Software\Update\Preferences\-FWCDone registry key. If this key either does not exist or has a default value other that "1" for example, the system will perform a FWC scan causing the appropriate registry keys to be forcibly re-written. At the completion of its scan, the system will write out this registry key with a default value of "1", signifying that the initial FWC scan has been performed. If this registry key has a default value of "1", this will signify to the system that it has previously performed its initial FWC scan, and it will instead perform a discrete background system scan.

In one embodiment, discrete background scans are performed periodically as an independent, idle process so as to minimize the impact of scanning on the system hardware configuration requirements. To begin, data-type management logic 102 checks the current user's data-type management preferences to determine if an initial FWC scan has been performed. If so, a discreet background scan is initiated. However, if an initial FWC scan has not been performed, one is initiated.

Another type of background scan is the immediate scan. Immediate scans are performed as quickly as possible without pacing. In one embodiment, immediate background system scans are run through a host application's preferences. For example, an example of when this type of scan would be invoked is when the user manually selects data-types to claim or release by way of system preferences through the host application.

Association Determination

As was alluded to above, in accordance with one embodiment, global/local rulesets 104 of the present invention are organized into three categories of databases, with each category having two sub-categories.

Figure 2:
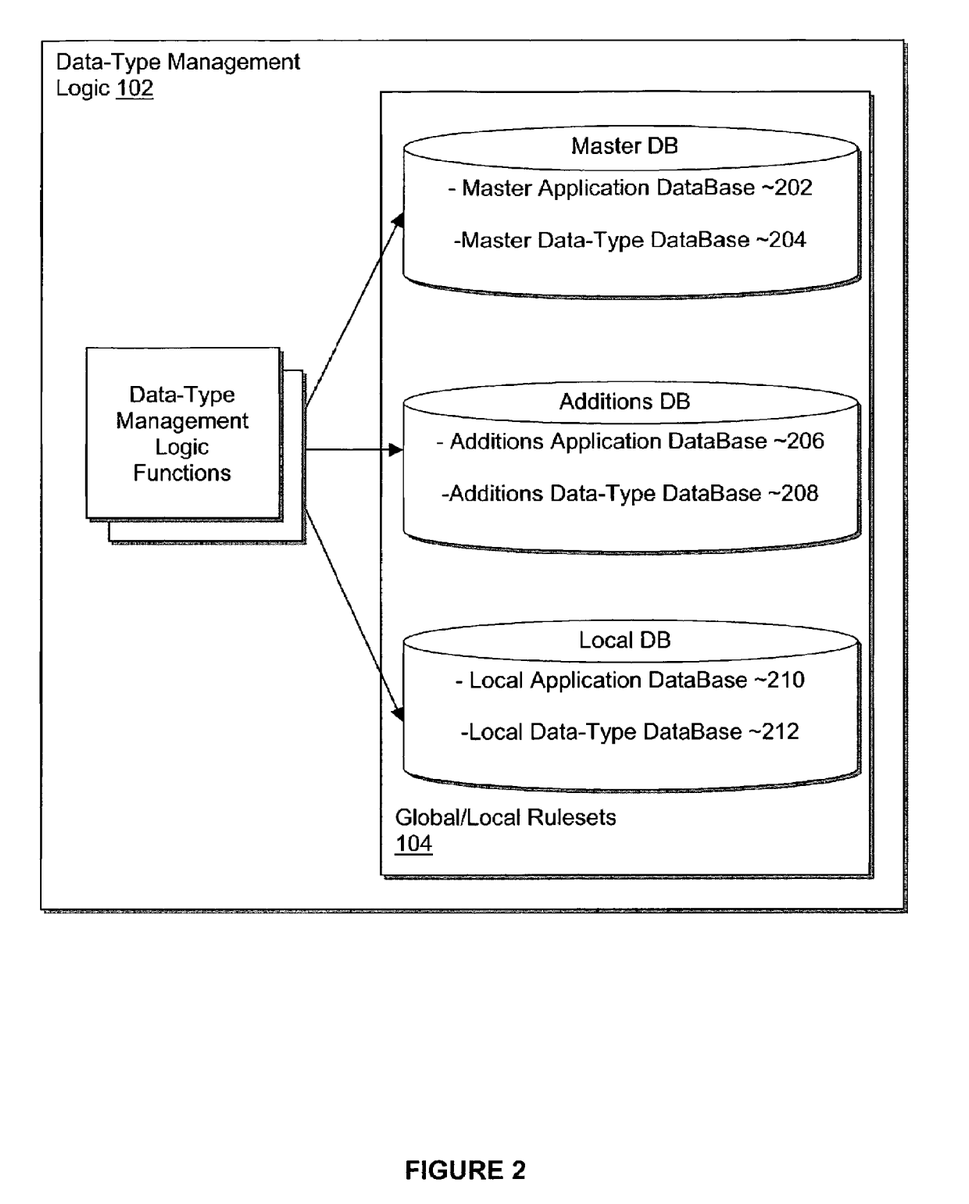
FIG. 2 illustrates various database categories and sub-categories of global/local rulesets, in accordance with one embodiment of the invention.

FIG. 2 illustrates various database categories and sub-categories of global/local rulesets 104, in accordance with one embodiment of the invention. As shown, data-type management logic 102 includes data-type management logic functions to operate on the Master, Additions, and Local databases of global/local rulesets 104. As shown further, the master database includes master application database 202 and master data-type database 204, while the Additions database includes Additions application database 206 and Additions data-type database 208, and the Local database includes Local application database 210 and Local data-type database 212.

In one embodiment of the present invention, the Master Application/Data-type database defines applications, optionally indicating ones deemed to have "bad behavior" (i.e. rogue applications), indicates an ordering of preferred applications for supported data-types, and indicates which applications are recommended for playback of a specific data-type. The information in the Master database influences how the system behaves when e.g. associating and reclaiming data-types. In one embodiment, the Master databases, are static once they are installed on the user's system, and only change when a new version of the entire database is delivered via install of a new application, or via an automatic update process. The Master databases reflect a particular view of application and data-type associations at the time that the databases are installed on the user's system. If, after the time that data type management system is installed, the view of this information changes, the Master databases on the user's system can be updated via an AutoUpdate process causing a new Master database to be delivered to the user's system.

The data-type management system also contains Additions databases, which are used to track applications that are installed to the user's system that claim data-types listed in the DTMasterDB database, and data-types that are not in the DTMasterDB database that have been registered with the data-type management system via one or more commands at an install or AutoUpdate event. Such a command might appear as part of an application install script to be parsed by the data-type management system and may contain File Extension(s), MIME-Type(s), Service Name, Data-Type Description, Class (Private(1)/Public(>1)), AutoStream CLSID, Kind (Normal (0,1)/Protocol (2)/OCX (3)/Audio CD (4)), Reservation (True (1)/False (0)), Preferred Applications [Application Name (Recommended (Yes/No)) (AutoStream (CLSID)) (Icon (Index of icon to be used)) (Type (String to be defined for ATH Queries of Data-Types))], and Perceived Type (audio, video, image, text, compressed, system). For example:

DATATYPE mp3 "audio/mp3 audio/x-mp3" RealPlayer.MP3.6 "MP3 Audio" 2 {CFCDAA03-8BE4-11CF-B84B-0020AFBBCCFA} 11 "RealPlayer.6 yes {CFCDAA03-8BE4-11CF-B84B-0020AFBBCCFA} 1 tlc NextApp.1 no no 0-" audio Similarly, a CLAIM command may be used to associate a data-type name with an application. For example, CLAIM RealPlayer.MP3.6

Furthermore, the data-type management system also uses the Additions databases to keep track of a user's custom changes to the database, so these changes can be preserved when a new version of the database is delivered to the user's system.

The Local database describes the current state of data-type registration/ownership on a user's system. It indicates which data-types are currently, or should be, assigned to which applications and thus, every user's Local databases will likely be different. The Local databases do not contain predefined data-type associations as the Master databases do. Instead, the Local databases depend on which applications/plug-ins the user has installed and which data-types have been given to various applications.

Application Database Definitions

One aspect of the data-type management databases is a list of application definitions. This list allows the system to find rogue applications, and allows the system to identify friendly applications for use in the data-type definitions. 'Rogue' implies an application that does not play fairly and may be damaging to a particular group of products on a user's system. There are two levels of Rogue, Rogue 1 and Rogue 2, with Rogue 2 being assigned to the worst offenders. Applications may be automatically promoted to Rogue 1 status, if for example, the system detects that a particular application has stolen data-types more than X times in at least Y days, the application is promoted to rogue 1 status in the Local database.

The following Table 1 details entries in the AppMasterDB database, and what they are used for:

TABLE 1

| Property | Values | Examples |
|---|---|---|
| Application ID | Unique identifier for application. - Used internally when specifying preferred applications for a data-type. | application id="Winamp.2" --or-- application id="RealJukebox.1" |
| Descriptive Name | Text String. - If empty, the client will try to get the friendly name from OS. This text is displayed in the UI to users. If the friendly name not available, the executable name will be used instead. | desc="RealPlayer 8" |
| Exe/Dll Name | Full file name. - The system may use this to determine if an application is installed, or to find which application has the association for a data-type. | exename="Realplay.exe" --or-- exename="Rundll32 media.dll" |
| Application Name | Description of the application. - Taken from the "Product Name" section of the application's resources | appname="RealPlayer (32-bit) " |
| Version Start | Standard versioning convention. The system will check version of exe/dll named above against the version specified here. | verstart="6.0.8.122" |
| Version End | Standard versioning convention. The system will check version of exe/dll named above against the version specified here | verend="6.0.9.230" |
| Rating | Indicates whether this is a preferred, rogue1, rogue2, or neutral application. Note: In the case of the Rating field of the Applications database, "neutral" refers to an application that is not known to the system. | rating="preferred" --or-- rating="rogue1" |
| Context Menu Class ID | Indicates the class ID used for context menu handler registrations on Windows Operating Systems | contextmenuCLSID="{F0CB00CD-5A07-4D91-97F5-A8C92CDA93E4}" |

Two example entries in the AppMasterDB database might appear as follows:

```
<application id="RealPlayer.6"
    desc="RealONE Player"
    exename="realplay.exe"
    appname="RealONE Player (32-bit)"
    verstart="6.0.9.900"
    verend="6.0.10.9999"
    rating="preferred"
    contextmenuCLSID="{F0CB00CD-5A07-4D91-97F5-
        A8C92CDA93E4}"
/>
<application id="Winamp.2"
    desc="Winamp ®"
    exename="Winamp.exe"
    appname="Winamp"
    verstart="0.0.0.0"
    verend="2.76.0.0"
    rating="rogue1"
/>
```

The following Table 2 details the entries in the AppAdditionsDB and what they are used for as well as examples of the database's entries.

TABLE 2

| Property | Values | Examples |
|---|---|---|
| Application ID | Unique identifier for application. - Used when specifying applications that have been installed on the user's system that are not listed in the AppMasterDB database. If the application is installed on the user's system using a DATATYPE or CLAIM command to register a data-type, the data populating this field will resemble the application id entry in the AppMasterDB database. If the application was installed without the use of a DATATYPE or CLAIM command, either before or after the data-type management system was installed, and is not listed in the AppMasterDB database, the data populating this field will be in the form of "exe/dll name__exe/dll version" | application id="Winamp.2" --or-- application id="wmplayer.exe__8.00.00.4195" |
| Descriptive Name | Text String. - The client will try to get the friendly name from OS. This text is displayed in the UI to users. If the friendly name not available, the executable name will be used instead. | desc="RealPlayer (32-bit)" -- or -- desc="realplay.exe" |
| Version Start | Standard versioning convention. The system will enter the version of exe/dll named above in the "verstart" field. | verstart="6.0.9.584" |
| Version End | Standard versioning convention. The system will enter the version of exe/dll named above in the "verend" field. | verend="6.0.9.584" |
| Exe/Dll Name | Full file name. - The system may use this to determine if an application is installed, or to find which application has the association for a data-type. | exename="Realplay.exe" --or-- exename="Rundll32 media.dll" |
| Application Name | Description of the application. - Taken from the "Product Name" section of the application's resources. If this entry does not exist, the executable name will be entered instead. | appname="RealPlayer (32-bit)" -- or -- appname="realplay.exe" |
| Rating | Indicates whether this is a preferred, rogue1, rogue2, or neutral application. Note: In all cases where the application is added to the AppAdditionsDB, the rating for the application will be "neutral". This is due to the fact that the application is added to the AppAdditionsDB because it is not known to the system system. | rating="neutral" |

Two example entries in the AppAdditionsDB database might appear as follows:

```
<application id="genericmediaplayer__6.0.9.584"
    desc="mediaplayer.exe"
    exename="mediaplayer.exe"
    appname="mediaplayer.exe"
    verstart="6.0.9.584"
    verend="6.0.9.584"
    rating="neutral"
/>
<application id="wmplayer.exe__8.00.00.4195"
    desc="Microsoft ® Windows Media Player"
```

-continued

```
    exename="wmplayer.exe"
    appname="Microsoft ® Windows Media Player"
    verstart="8.00.00.4195"
    verend="8.00.00.4195"
    rating="neutral"
/>
```

The following Table 3 details the entries in the AppLocalDB database, what they are used for, as well as examples of the database entries.

TABLE 3

| Property | Values | Examples |
|---|---|---|
| Application ID | Taken from the entries made in the AppMasterDB and AppAdditionsDB databases. | application id="RealPlayer.8" --or-- application id="wmplayer.exe_8.00.00.4195" |
| Path | The path to the application on the user's system. | path="C:\Program Files\Real\RealPlayer\realplay.exe" |
| Last Steal Date | The date of the last time the application stole a data-type from a target application. | laststeal="2/5/01" |
| Number of Steals | The number of times that the application has stolen a particular data-type from a target application per session. Note: This is incremented by a factor of X for each steal, and will reset itself to 0 after a count of Y steals has been reached. | numsteals="4" |
| List of Data-Types Stolen | A list of all data-types stolen from a target application by the application. This list will contain a list of all of the data-types stolen by the application per session in a list of data-type service names separated by spaces "". Note: Once an application has stolen data-types from the system, and these data-types have been added to the liststeals entry, if, the next time that the application steals data-types from the system, the data-types stolen do not include a data-type currently listed within the liststeals entry, the omitted data-type is not removed from the liststeals entry. | liststeals="RealPlayer.MP3.6" --or-- liststeals="RealPlayer.MP3.6 DT2 DT3 DT4" |
| Rating | Indicates whether this is a preferred, rogue1, rogue2, or neutral application. Note: In this case, "neutral" refers to an application that is not known to the system. | rating="preferred" --or-- rating="rogue1" |

An example entry in the AppLocalDB database might appear as follows:

```
<application id="Winamp.2"
    path="C:\Program Files\Winamp\winamp.exe"
    laststeal="2/5/01"
    numsteals="4"
    liststeals="RealPlayer.MP3.6 RealPlayer.AU.6
```

```
    RealJukebox.emm.1"
    rating="rogue1"/>
```

The following Table 4 details the entries in the DTMasterDB database, and what they are used for, as well as examples of the database's entries.

TABLE 4

| Property | Values | Example |
|---|---|---|
| Data-Type Service Name | Unique identifier for data-type. | datatype name="RealPlayer.Flash.6" |
| Descriptive Name | Text String. - Provides short description of data-type that is displayed in the UI to users. | desc="RealG2 With Flash Animation" |
| Class | Indicates whether the data-type is public or private | class="public" |
| Kind | Indicates whether the entry is "normal" (standard data-type), "protocol", "ocx" (Active-X GUID for the embedded player), or audiocd (data input from a removable media device, e.g. - Audio CD insertion) | kind="normal" |

TABLE 4-continued

| Property | Values | Example |
|---|---|---|
| File Extensions | List of file extensions used by data-type. | ext="rf" |
| Mime-types | List of file mime-types used by data-type. | mime="image/vnd.rn-realflash" |
| Reserve Flag | Text string (True/False) - Tells the system whether or not to assign an unclaimed data-type to an installed non-recommended application. Note: If a data-type is reserved, it is marked as "unclaimed" in the DTLocalDB. | reserve="true" |
| Application List | The application list details the preferred applications for a data-type, as well as whether it is: recommended, and can AutoStream media. The following three items break this feature down into its individual components. | applist |
| Preferred Applications | List of AppIDs for preferred handlers of this data-type. - The first application in the list has the highest priority, and the last application the lowest. If the data-type is added to the system through the DATATYPE or CLAIM commands, the default preferred application is the application that installed the data-type. | app name="RealPlayer.8" |
| Recommended | Used in conjunction with the Preferred application list. A Yes/No entry detailing whether the application listed in the preferred list is also recommended. If the data-type is added to the system through the DATATYPE or CLAIM commands, the default preferred application is the application that installed the data-type. | recommend="yes" |
| AutoStreaming | Used in conjunction with the Preferred application list. The CLSID listed is registered for the data-type within the system registry. If this entry is a dash "-", indicating that the data-type is not to be autostreamed for the preferred application, no CLSID is written to the system registry for the data-type. | autostream="{CFCDAA03-8BE4-11CF-B84B-0020AFBBCCFA}" |
| Icon Assignment | Used in conjunction with the Preferred application list. The value for this entry represents the index of the icon as resourced within the application's executable file, and is entered into the system registry as the default icon assignment for the data-type on the system. | icon="0" |
| Type Parameter | Used in conjunction with the Preferred application list. The value for this entry is treated by the system as a string, but can be used by applications to group data-types into whatever groupings they desire. For example, RealOne Player could have a value of "tlc" for all data-types that they wish to be handled by the top level client and a value of "core" for all data-types that they wish to pass directly to the core. In this way, if they encounter a data-type, and want to make a determination of this kind, they can simply query the system for the grouping of the data-type in question. | Typt="tlc" |
| Perceived Type | Defines the data-type within the OS as a member of the given perceived type group. The value for this entry is entered into the system registry of all WinXP systems within the file extension registry key. | perceivedtype="audio" |

TABLE 4-continued

| Property | Values | Example |
|---|---|---|
| Arguments | Defines any command-line arguments required by the application. The value for this entry is entered into the command line of the application handling the data-type. | arguments="/autoplay" |

EXAMPLE

```
<datatype name="Real Player.MP3.6"
        desc="MP3 Audio"
        class="public"
        kind="normal"
        ext="mp3"
        mime="audio/mp3 audio/x-mp3"
        reserve="true"
        perceivedtype="audio"
        arguments="/autoplay">
    <applist>
        <app name="RealPlayer.6" recommend="yes"
            autostream="{CFCDAA03-8BE4-11CF-B84B-
            0020AFBBCCFA}"icon="1" type="tlc"/>
        <app name="FaustTest2.1"
        recommend="yes" autostream="-
        "icon="0" type=""/>
            <app name="FaustTest1.1"    recommend="no"
            autostream="-" icon="0" type="playable"/>
    </applist>
</datatype>
```

In the case of a Protocol registration in the data-type databases, the "File Extensions" (ext) and "Mime-types" (mime) sections of the database may be left blank ("") as the system natively understands the "kind="protocol"" entry, and will make the proper system registrations. In the case of a removable media drive registration, such as a CD-ROM, in the data-type databases, the "File Extensions" (ext) and "Mime-types" (mime) sections of the database are left blank ("") as the system natively understands the "kind="audiocd"" entry, and will make the proper system registrations. In the case of a GUID registration, for Active-X GUIDs involved with the embedded player, in the data-type databases, the "File Extensions" (ext) and "Mime-types" (mime) sections of the database are left blank ("") as the system natively understands the "kind="ocx"" entry, and will make the proper system registrations.

The DTAdditionsDB database follows the same format as the DTMasterDB database. In one embodiment, the DTAdditionsDB database is populated with DATATYPE commands issued e.g. during the installation of an application or plug-in.

The following Table 5 details the entries in the DTLocalDB database, and what they are used for, as well as examples of the database's entries:

TABLE 5

| Property | Values | Example |
|---|---|---|
| Data-Type Service Name | Unique identifier for data-type. | datatype name="RealPlayer.MP3.6" |
| Previous Internet Explorer Mime-Type | The previous mime-type registered with Internet Explorer | OldMime\IE32="audio/mpeg" |
| Previous Internet Explorer Viewer | The path to the application registered as the previous viewer for the mime-type listed in the "OldMime\IE32" entry of the database | OldViewer\IE32="C:\Program Files\Windows Media Player\wmplayer.exe" |
| Previous Netscape Mime-Type | The previous mime-type registered with Netscape | OldMime\Netscape32="audio/mpeg" |
| Previous Netscape Viewer | The path to the application registered as the previous viewer for the mime-type listed in the "OldMime\Netscape32" entry of the database | OldViewer\Netscape32="C:\Program Files\Windows Media Player\wmplayer.exe" |
| Previous Opera Viewer | The path to the application registered as the previous viewer for the mime-type listed within the Opera.ini file | OldViewer\Opera="C:\Program Files\Windows Media Player\wmplayer.exe" |
| Previous Viewer | The path to the previous viewer registered with the operating system for an open event. | OldViewer="C:\Program Files\Windows Media Player\wmplayer.exe" |
| Claim Status | The current claimed status of the data-type. This can be either unclaimed by an application (unclaimed), claimed by an application, but the user has not | claim="claimed" |

TABLE 5-continued

| Property | Values | Example |
| --- | --- | --- |
| | specifically granted the data-type association (claimed), or claimed by an application, and the user has specifically granted the data-type association (blessed). | |
| Claiming Application | The service name of the application that has claimed the data-type through the system.<br>Note: This field is left blank if the claim status of the data-type is "unclaimed". | claimapp="RealPlayer.8" |
| Previous Service Name of the Data-Type | The previous service name for the data-type as registered with the OS prior to the data-type being assigned through the system. | OldServiceName="mp3file" |
| Local Definitions | The flag for the system that informs the system that the definition of the data-type are held not in the DTMasterDB, but within the DTAdditionsDB. | local="true"<br>-- or --<br>local="false" |

EXAMPLE

```
<datatype name="RealPlayer.MP3.6"
    OldMime="audio/mpeg"
    OldMime\Netscape32="audio/mp3"
    OldServiceName="mp3file"
    OldViewer="C:\Program Files\Windows Media
        Player\wmplayer.exe" /Play"
    Old Viewer\Netscape32=""C:\PROGRA~1\WINDOW~3
        \wmplayer.exe""
    claim="blessed"
    claimapp="RealPlayer.6"/>
```

Dynamic Updating

It is sometimes necessary for master databases of the data-type management system of the present invention to be updated. This can occur for example as a company modifies its view of the current data-type landscape. The following items include a variety of circumstances that may trigger at least one new Master database to be delivered to the system. Such circumstances include the introduction of new data-types that need to be added to the system, data-types residing in the system that need to be removed, the recommend flag for a particular data-type needing to be modified, the autostream flag for a particular data-type needing to be modified, the reserve flag for a particular data-type needing to be modified, any of the descriptive information for a particular data-type needs to be modified, the priority listing of applications listed as preferred in the system needs to be modified, the version range for a particular application needs to be modified, the rating for a particular application needs to be modified, any of the descriptive information for a particular application needs to be modified, and so forth. In accordance with one embodiment of the invention, the occurrence of any of these circumstances causes a new Master database to be delivered transparently to the local system through e.g. an AutoUpdate function. In one embodiment, the information contained in the new Master databases is applied to the data-type management system immediately, by way of an install script command to schedule a FWC scan to occur at the end of the AutoUpdate session. In one embodiment, all Master databases installed to the user's system by way of AutoUpdate will take place silently, and will either be tethered to other AutoUpdate packages or will be downloaded and installed to the user's system through a silent AutoUpdate check. The same logic holds true for either of these methods of installing Master databases.

Figure 3:
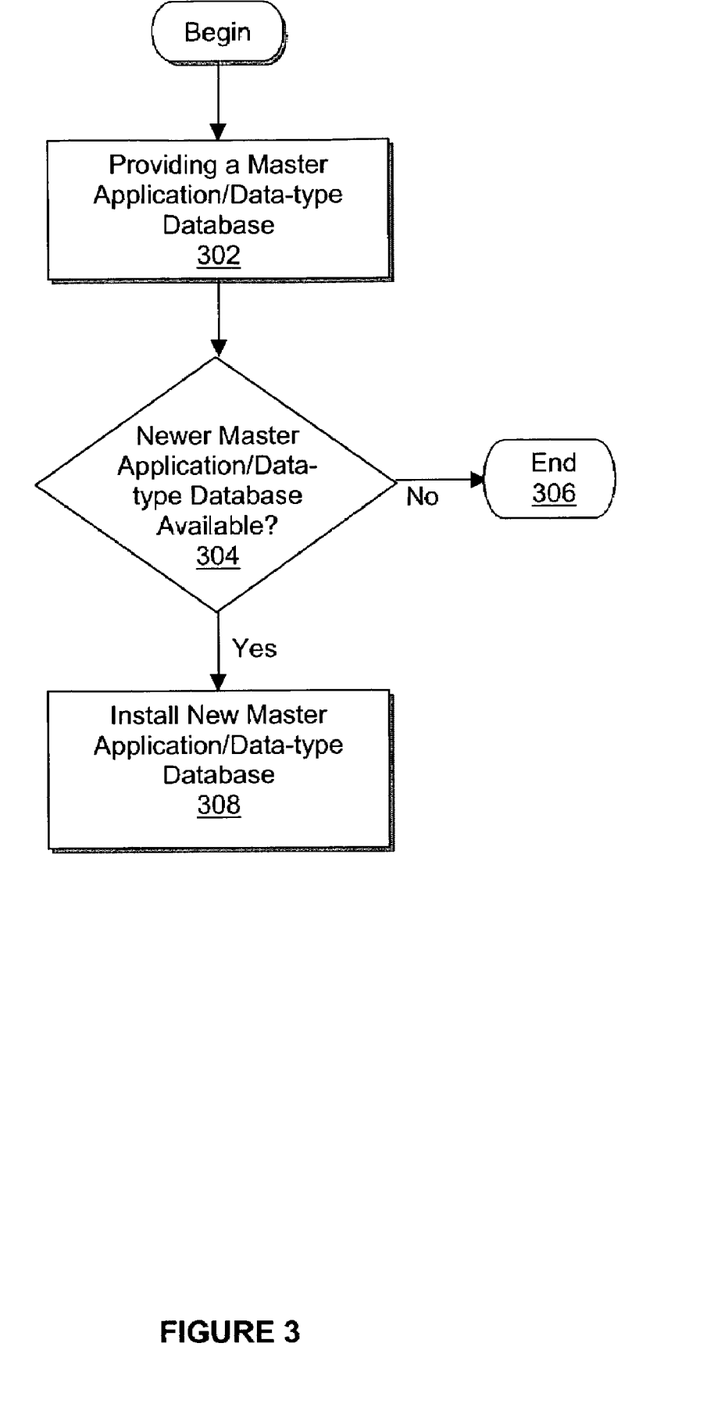
FIG. 3 is a flow diagram illustrating a Master database update process in accordance with one embodiment of the invention.

FIG. 3 is a flow diagram illustrating a Master database update process in accordance with one embodiment of the invention. To begin, an installed Master Application/Data-type database is first provided (block 302) and then compared against one or more remote or non-installed Master Application/Data-type databases to determine which database is newer (block 304). If the currently installed Master Application/Data-type database is newer, the process ends (block 306). If, however, the non-installed Master Application/Data-type database is found to be newer, the non-installed Master Application/Data-type database is installed onto the client device instead (block 308). In one embodiment, any AutoUpdate server contact or client install causes a new Master Application/Data-type database to be installed if the database in the AutoUpdate system or in the installer has a higher version than that currently in the user's client. In the case of an offline installation, the client uses the Master database contained in the installer, and updates it at its earliest convenience. This implies that a Master database update may occur long after an offline install event, but this is an acceptable tradeoff for a better user experience. If the existing Master Application/Data-type database is determined to be newer than the database it is compared against, then the process ends.

Figure 4:
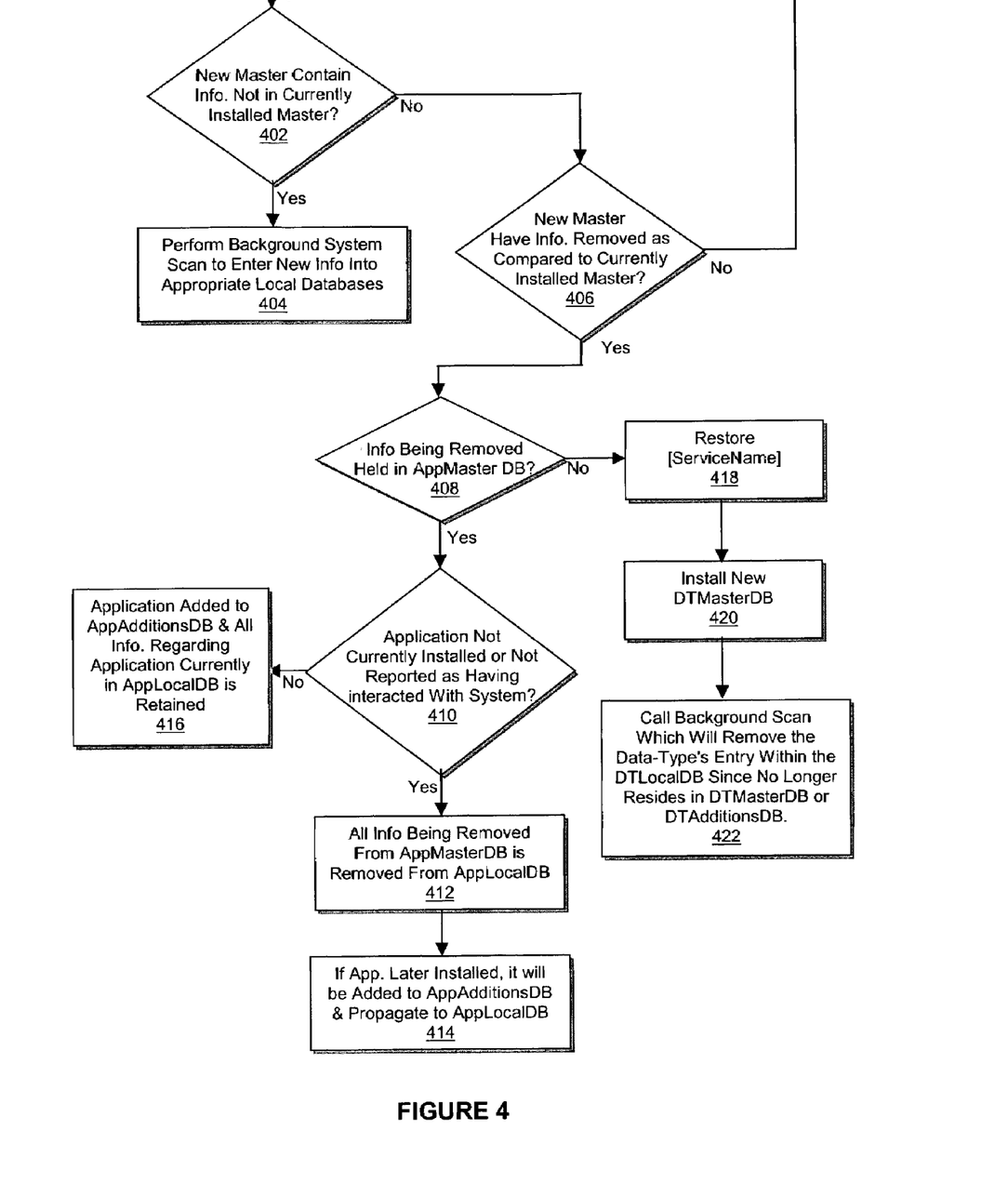
FIG. 4 is a flow diagram illustrating a method for updating ruleset information, in accordance with one embodiment of the invention.

FIG. 4 is a flow diagram illustrating a method for updating ruleset information, in accordance with one embodiment of the invention. To begin, a determination is made as to whether the new Master database contains new information that was not within the Master database currently installed on the user's system (block 402). If so, this information is entered into the appropriate Local database by way of a background system scan, which may occur e.g. at the end of the AutoUpdate session (block 404). This information is then applied to the user's system following the system scanning rules. At block 406, a determination is made as to whether the new Master database being delivered to the user's system has had information removed from it as compared to the Master database currently installed on the user's system. If not, the process either ends or repeats from the start (block 402). If, however, the new Master database being delivered to the user's system has had information removed from it as compared to the Master database currently installed on the user's system, a further determination is made as to whether the information that has been removed is held within the AppMasterDB (i.e. an application is being removed from the system) (block 408). If so, a further determination is made as to whether the application is either not currently installed, or is not reported as having interacted with the data-type management system on the user's system (i.e. has never stolen a data-type, or had been associated for a data-type within the system) (block 410). If so, information regarding the application being removed from the AppMasterDB is removed from the AppLocaDB (block 412). If the application is later installed to the system by the user, or is currently installed and later steals a data-type held within the system, it will be added to the AppAdditionsDB, and propagate to the AppLocalDB as usual (block 414). If the application in question is currently installed on the user's system, and has, either currently, or in the past, been associated to a data-type held within the system, the application is added to the AppAdditionsDB and all information regarding the application that is currently in the AppLocalDB is retained (block 416).

If, at block 408, a determination is made that the information being removed is not held within the DTMasterDB (i.e. support for a data-type is being removed from the system), the process is handled in a different way. Whereas a standard background system scan will take care of removing the data-type information from the DTLocalDB, it will not take care of restoring the old viewer for the data-type. To handle this problem, the install script for the new DTMasterDB AutoUpdate package contains the "RESTORE" install script command. This command follows the syntax "RESTORE [servicename]", where the "servicename" parameter is the service name for the data-type within the system that is being removed (block 418). When this install script command is run, it calls a function to restore the old viewer for the data-type being removed, and removes the data-type from the DTAdditionsDB if it is there. After this function performs this action, the new DTMasterDB is installed (block 420), and replaces the currently installed DTMasterDB. At the end of the AutoUpdate session, a background system scan is called, which will remove the data-type's entry within the DTLocalDB, due to the fact that it no longer resides within the DTMasterDB or the DTAdditionsDB (block 422).

Reserving Data-Types

As was alluded to earlier, data-type reservation, in general, is the act of taking over an unassociated data-type when either a suitable application to handle the data-type is not installed on the user's system, or a suitable application is installed, but the data-type has not been claimed by the application. In one embodiment of the invention, all reserved data-types are marked as "Unclaimed" to an associated application in the local data-type database (DTLocalDB), so that the data-type management system will not fight to keep the data-type association if another application steals it from the system.

Figure 5:
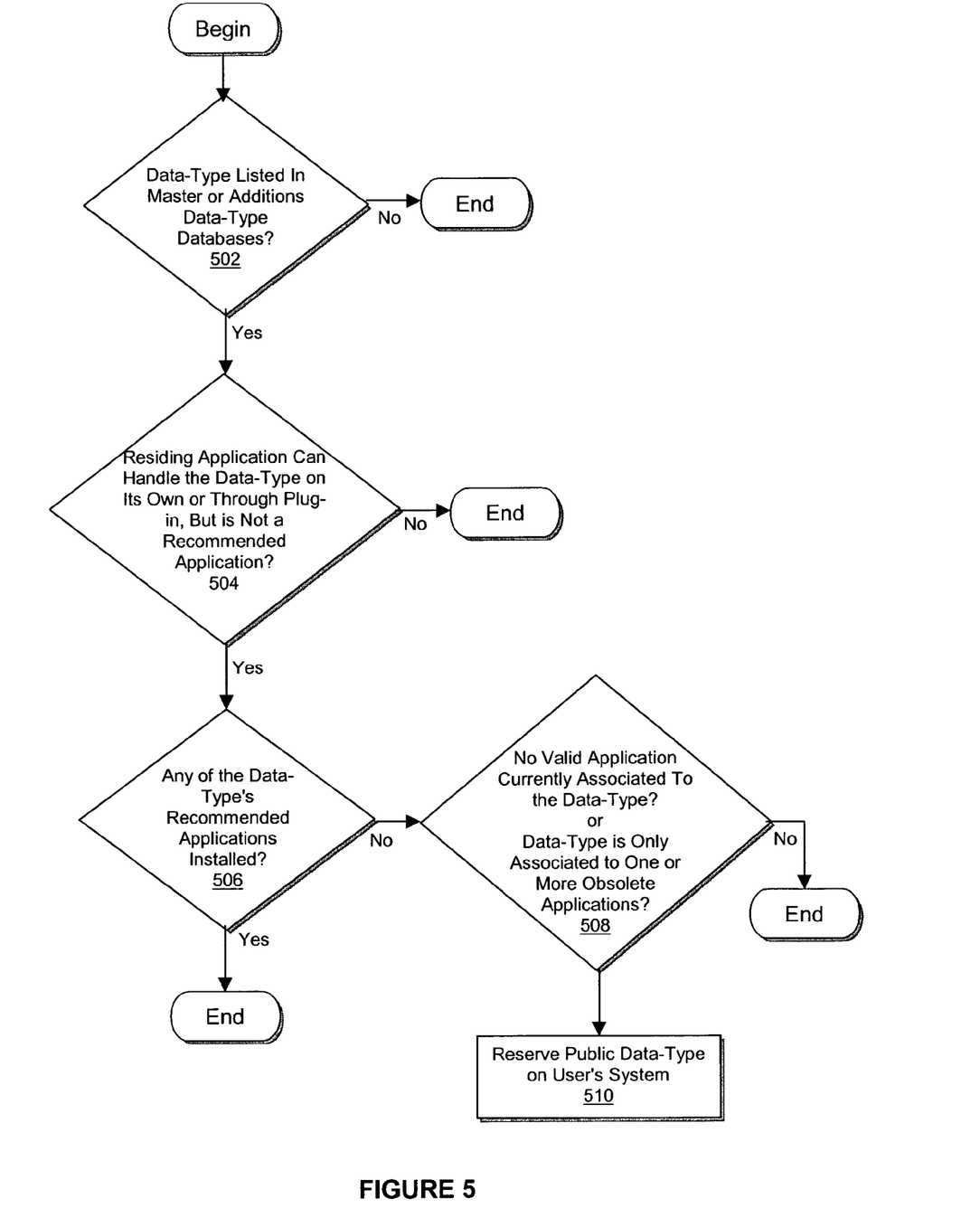
FIG. 5 illustrates a client/server networking arrangement wherein a distribution/update server is communicatively coupled to multiple client devices equipped with the Data-type management services (DTM) of the present invention.

FIG. 5 illustrates one embodiment of a flow diagram for automatically reserving a public data-type on a user's system. The process begins by determining whether the public data-type to be reserved is listed in the Master or Additions Data-Type databases (block 502). If not, the process ends as that particular public data-type is used by other applications. If the public data-type to be reserved is listed in the Master or Additions Data-Type databases, however, a further determination is made as to whether an application residing on the user's client device can handle the public data-type on its own or through a plug-in, but is nevertheless not a recommended application (block 504). If either the residing application cannot handle the public data-type or it is a recommended application, then the process ends. However, if the residing application can handle the public data-type and is not a recommended application, then a determination is made as to whether any of the Data-Type's recommended applications are installed on the user's client device (block 506). If any of the Data-Type's recommended applications are installed on the user's client device, then the process ends. However, if none of the Data-Type's recommended applications are installed on the user's client device then a final determination is made. At block 508, a determination is made as to whether either no valid application is currently associated with the Data-Type, or the Data-Type is only associated with one or more obsolete applications. If so, the public Data-Type is automatically reserved on the client device. In one embodiment, if the data-type management system determines that a data-type is registered to an application in the client device registry, the system verifies that the application is installed on the client device. If the application no longer resides on the client device, then the system assigns the public data-type to the highest priority installed, preferred application as listed in the Master data-type database (DTMasterDB).

In one embodiment the data-type management system automatically reserves private data-types on a user's client device if the data-type is listed in the Master Application/Data-type database, and none of the data-type's recommended applications are installed on the client device. As with public data-types, if the above conditions are met with regards to private data types, the system assigns the private data-type to the highest priority installed, preferred application as listed in the Master data-type database (DTMasterDB).

Distribution Model

Figure 6:
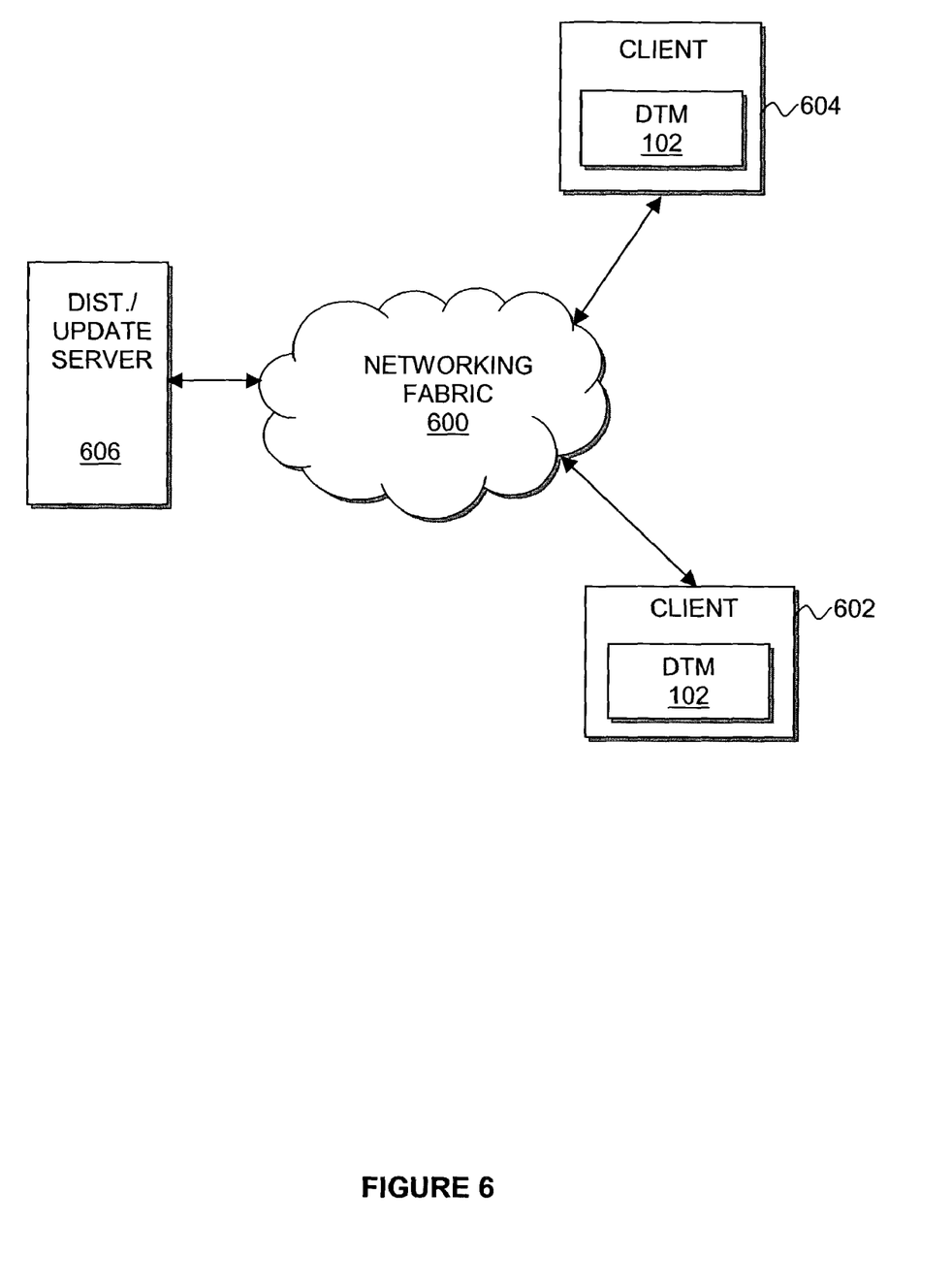
FIG. 6 illustrates a client server networking arrangement wherein a distribution/update server is communicatively coupled to multiple client devices equipped with the Data-type management services of the present invention.

FIG. 6 illustrates a client server networking arrangement wherein a distribution/update server is communicatively coupled to multiple client devices equipped with the Data-type management services (DTM-105) of the present invention. In one embodiment, distribution/update server 506 is equipped with one or more global/local rulesets 104 in the form of one or more master databases to facilitate dynamic data-type updating of the present invention. Additionally, distribution/update server 506 may be equipped with one or more application plug-ins to facilitate automated client-application updates for the benefit of clients 602/604. Accordingly, clients 602/604 may connect (e.g. transparently to the user) to distribution/update server via networking fabric 100 to retrieve one or more remote copies of the Master application and/or Master Data-type databases, described above in accordance with the teachings of the present invention.

Example Client System

Figure 7:
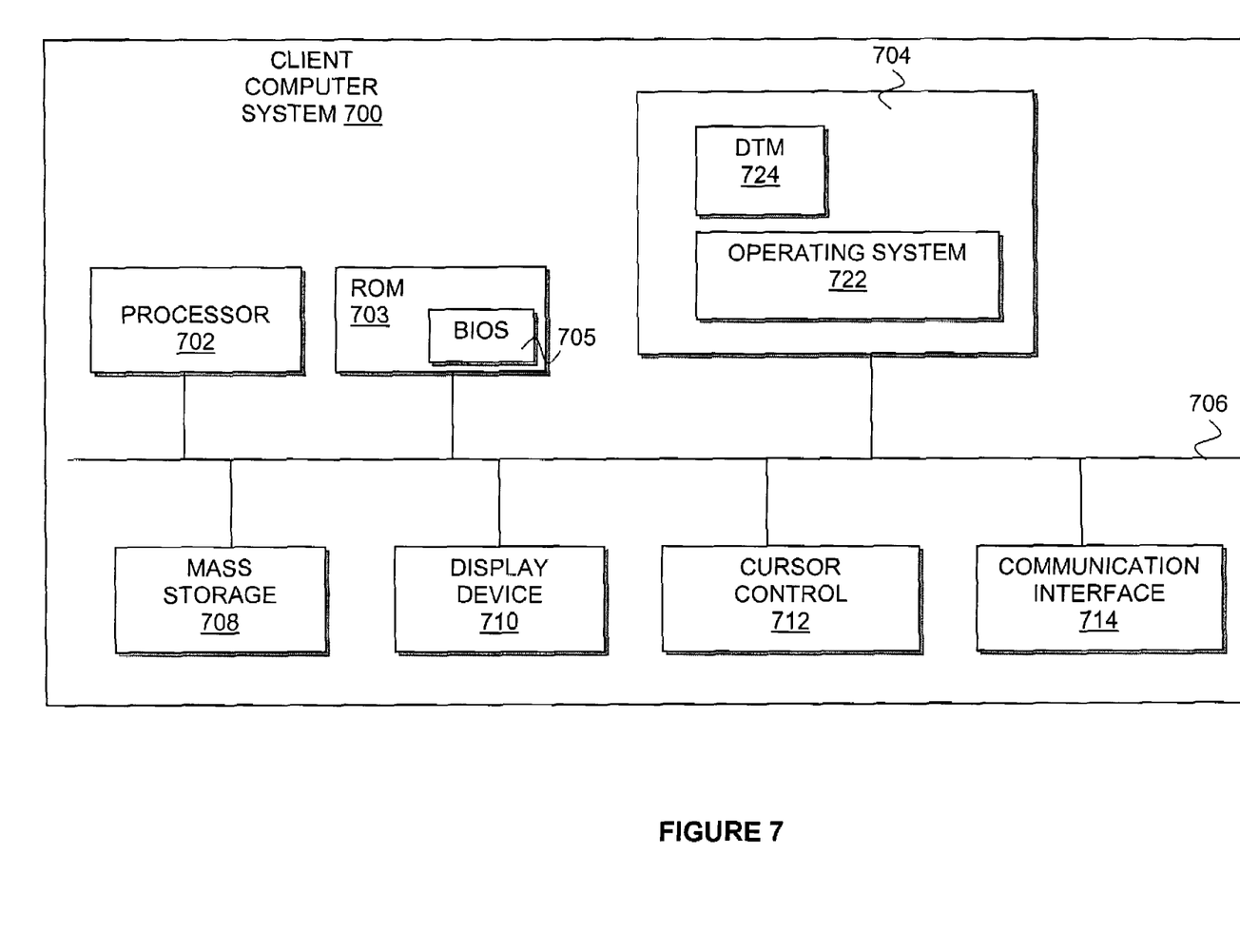
FIG. 7 illustrates an example client computer system suitable for practicing the present invention.

FIG. 7 illustrates an example client computer system suitable for practicing the present invention. As shown, example client computer system 700 includes processor 702, ROM 703 including basic input/output system (BIOS) 705, and system memory 704 coupled to each other via "bus" 706. Also coupled to "bus" 706 are non-volatile mass storage 708, display device 710, cursor control device 712 and communication interface 714. During operation, memory 704 includes working copies of operating system 722, and data-type management logic 724 of the present invention to facilitate file/MIME-type association management. In one embodiment, operating system 722 is a Microsoft Windows based operating system that interacts with data-type management logic 724 to facilitate such association management.

Except for the teachings of the present invention as incorporated herein, each of these elements is intended to represent a wide range of these devices known in the art, and otherwise performs its conventional functions. For example, processor 702 may be a processor of the Pentium® family available from Intel Corporation of Santa Clara, Calif., which performs its conventional function of executing programming instructions of operating system 722 and player/viewer 724, including those implementing the teachings of the present invention. ROM 703 may be EEPROM, Flash and the like, and memory 704 may be SDRAM, DRAM and the like, from semiconductor manufacturers such as Micron Technology of Boise, Id. Bus 706 may be a single bus or a multiple bus implementation. In other words, bus 706 may include multiple properly bridged buses of identical or different kinds, such as Local Bus, VESA, ISA, EISA, PCI and the like.

Mass storage 708 may represent disk drives, CDROMs, DVD-ROMs, DVD-RAMs and the like. Typically, mass storage 708 includes the permanent copy of operating system 722 and player/viewer 724. The permanent copy may be downloaded from a distribution server through a data network (such as the Internet), or installed in the factory, or in the field. For field installation, the permanent copy may be distributed using one or more articles of manufacture such as diskettes, CDROM, DVD and the like, having a recordable medium including but not limited to magnetic, optical, and other mediums of the like.

Display device 710 may represent any of a variety of display types including but not limited to a CRT and active/passive matrix LCD display, while cursor control 712 may represent a mouse, a touch pad, a track ball, a keyboard, and the like to facilitate user input. Communication interface 714 may represent a modem interface, an ISDN adapter, a DSL interface, an Ethernet or Token ring network interface and the like.

As those skilled in the art will also appreciate, from the description the follow, the present invention may also be practiced without some of the above-enumerated elements, or with additional elements, such as graphics accelerators, audio and video add-on cards, and so forth.

Epilog

While the present invention has been described in terms of the above-illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. In a client device, a method comprising:
providing a first master database, the master database including one or more predefined operational relationships between two or more applications;
determining whether an updated master database is available;
dynamically obtaining the updated master database to facilitate modification of one or more predefined operational relationships between two or more applications locally installed on the client device; and
generating a local database defining one or more local relationships between two or more independent applications installed on the client device to supplement the master database.

2. The method of claim 1, wherein generating a local database further comprises: performing a first data-type association scan of the client device to identify one or more data associations between at least one originating application and at least one target application installed on the client device.

3. The method of claim 2, further comprising: periodically performing additional data-type association scans to determine whether any additional local applications have been installed on the client device.

4. The method of claim 3, wherein at least a subset of the identified one or more data associations are dynamically modified as a result of one or more of the additional data-type association scans determining that at least one additional local application has been installed on the client device.

5. The method of claim 1, wherein generating a database further comprises: automatically associating one or more data-types with one or more applications installed locally on the client without user confirmation.

6. The method of claim 1, wherein generating a database further comprises: associating one or more data-types with one or more applications installed locally on the client after explicit user confirmation.

7. The method of claim 1, wherein the updated master database is obtained from a remote device.

8. The method of claim 1, wherein the updated master database prospectively reserves at least one new data-type for use by a preferred application independent of whether the preferred application is installed on the client device.

9. The method of claim 1, wherein the updated master database is obtained as a result of a comparison between the first master database and the updated master database.

10. The method of claim 1, wherein a data-type comprises one or more file extension and mime-type combinations.

11. An apparatus comprising:
a storage medium; and
a plurality of instructions stored in said storage medium to
provide a first master database, the master database including one or more predefined operational relationships between two or more applications,
determine whether an updated master database is available;
dynamically obtain the updated master database to facilitate modification of one or more predefined operational relationships between two or more applications locally installed on the client device; and
instructions stored in said storage medium to generate a local database defining one or more local relationships between two or more independent applications installed on the client device to supplement the master database.

12. The apparatus of claim 11, wherein the instructions to generate a local database further comprise instructions to perform a first data-type association scan of the client device to identify one or more data associations between at least one originating application and at least one target application installed on the client device.

13. The apparatus of claim 12, further comprising instructions stored in said storage medium to periodically perform additional data-type association scans to determine whether any additional local applications have been installed on the client device.

14. The apparatus of claim 13, wherein at least a subset of the identified one or more data associations are dynamically modified as a result of one or more of the additional data-type association scans determining that at least one additional local application has been installed on the client device.

15. The apparatus of claim 11, wherein the instructions to generate a local database further comprise instructions to automatically associate one or more data-types with one or more applications installed locally on the client without user confirmation.

16. The apparatus of claim 11, wherein the instructions to generate a local database further comprise instructions to associate one or more data-types with one or more applications installed locally on the client after explicit user confirmation.

17. The apparatus of claim 11, wherein the updated master database is obtained from a remote device.

18. The apparatus of claim 11, wherein the updated master database prospectively reserves at least one new data-type for use by a preferred application independent of whether the preferred application is installed on the client device.

19. The apparatus of claim 11, wherein the updated master database is obtained as a result of a comparison performed between the first master database and the updated master database.

20. The apparatus of claim 11, wherein a data-type comprises one or more file extension and mime-type combinations.

21. A computer system comprising:
  at least one client device having a processor;
  means for providing a first master database, the master database including one or more predefined operational relationships between two or more applications;
  means for determining whether an updated master database is available;
  means for dynamically obtaining the updated master database to facilitate modification of one or more predefined operational relationships between two or more applications locally installed on the client and
  means for generating a local database defining one or more local relationships between two or more independent applications installed on the client device to supplement the master database.

22. The computer system of claim 21, wherein said means for dynamically obtaining the updated master database comprise network interface means for communicating across a communications network.

* * * * *